April 1, 1969          E. SCHMIDT          3,435,506

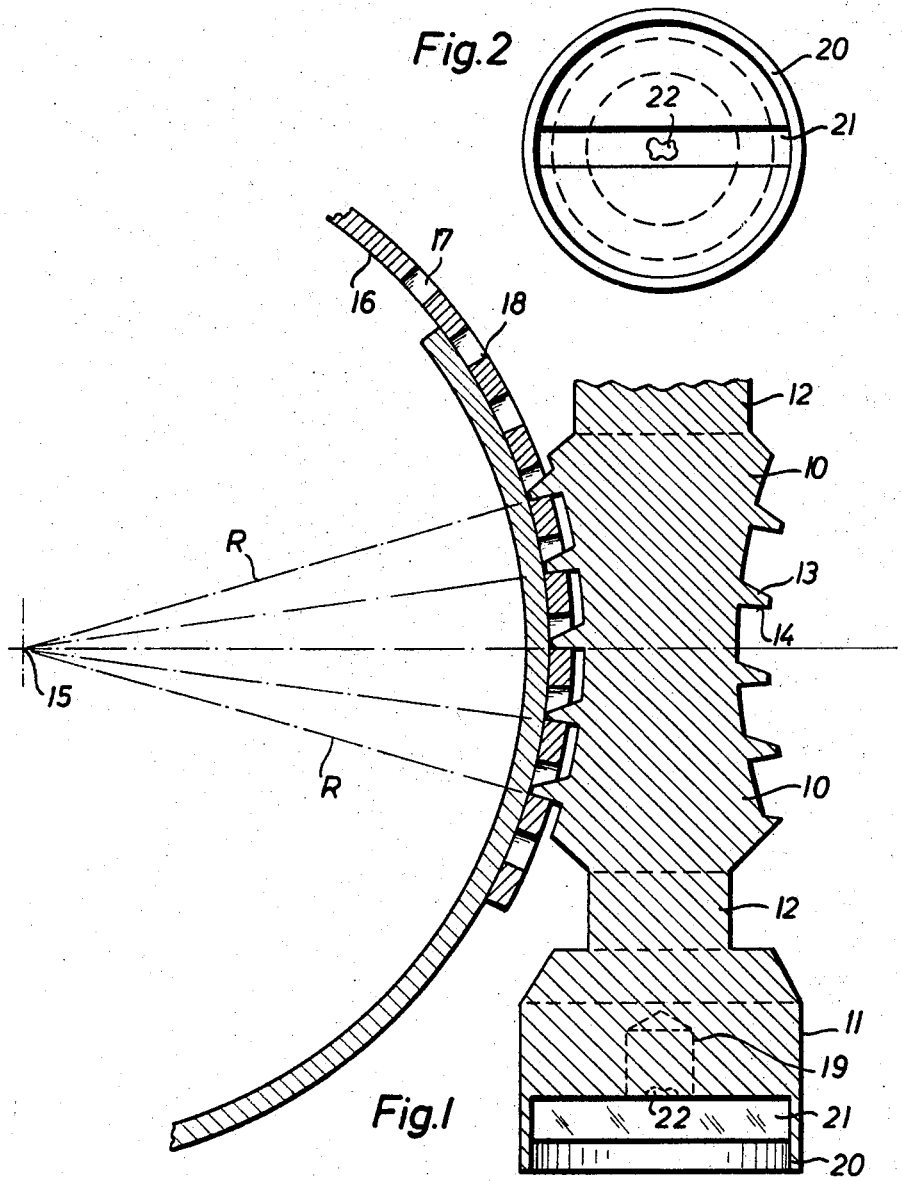

METHOD OF FORMING A SLOT FOR A SCREWDRIVER

Filed March 17, 1966

INVENTOR
Ernst Schmidt

BY
Michael J. Striker

United States Patent Office 3,435,506
Patented Apr. 1, 1969

3,435,506
METHOD OF FORMING A SLOT FOR A SCREWDRIVER
Ernst Schmidt, Rheinallee 7, Remagen-Kripp, Germany
Filed Mar. 17, 1966, Ser. No. 535,180
Claims priority, application Germany, Mar. 20, 1965, Sch 36,737
Int. Cl. B21h 5/00; B21k 1/30; B23p 15/14; B29d 15/00
U.S. Cl. 29—159.2                                         2 Claims

ABSTRACT OF THE DISCLOSURE

An annular rim is formed at one end of a worm gear by cold deformation so that a screwdriver inserted into a slot within the rim cannot slip.

Screwdrivers inserted into a slot at the end of a threaded member frequently slip off the end of the threaded member.

It is the object of the invention to prevent slipping of a screwdriver off the end of a member which is turned by the screwdriver.

With this object in view, the present invention provides a method for forming a rim at the end of the member surrounding the slot so that a screwdriver is retained by the rim and cannot slip out of the slot.

In the preferred method of the invention, an axial bore is formed at one end of a threaded member having a diameter slightly smaller than the outer diameter of the member at this end so that an annular rim and a flat bottom face are formed, forming within the rim a second bore having a diameter considerably smaller than the diameter of the first bore, and pressing a slot into the bottom face so that the cold deformed material flows into the second bore whereby the bottom face remains substantially flat.

The screwdriver can now be inserted into the slot whose ends are closed by the annular rim so that the screwdriver cannot slip out of the slot and off the end of the threaded member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

FIG. 1 is a partial axial cross section through a worm gear drive according to the present invention in which the worm engages a clamping strip of a pipe clamp or the like;

FIG. 2 is an end view of the worm shown in FIG. 1;

Figure 3:
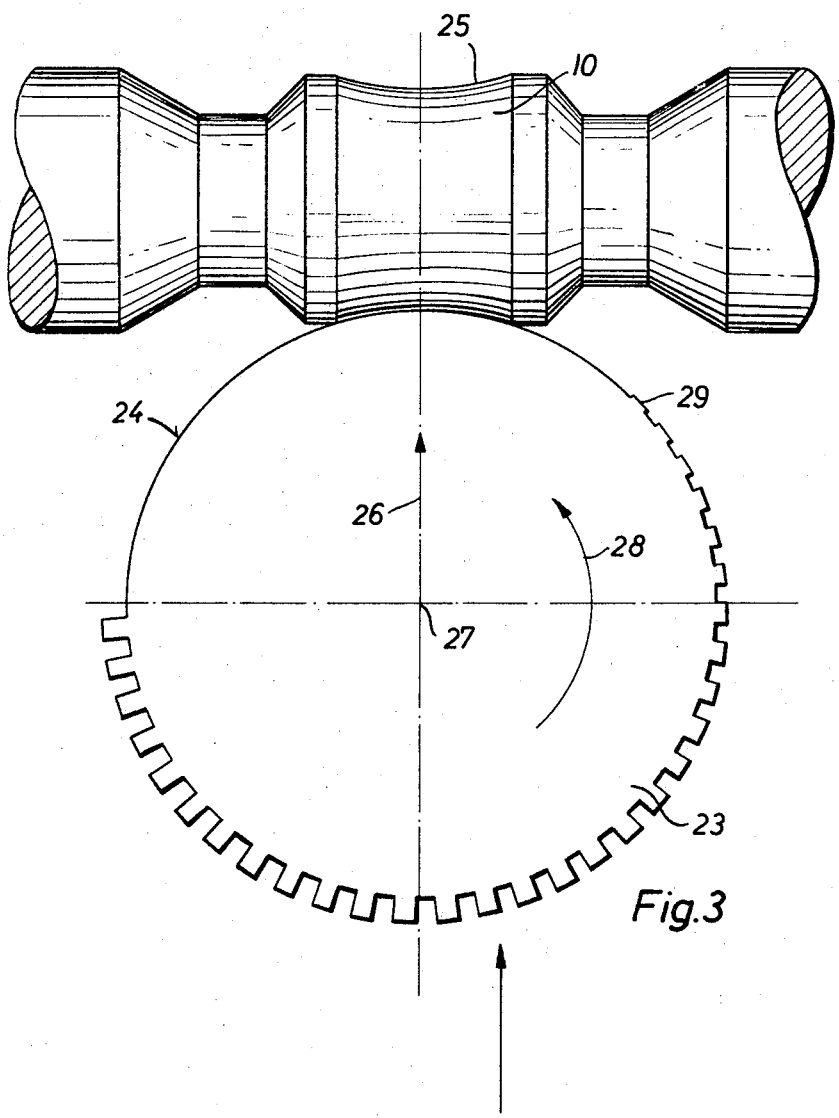
FIG. 3 is a side view of a worm gear blank and a chasing tool engaging the blank for forming a worm with teeth in substantially rectangular cross section.

FIG. 1 illustrates a worm gear drive according to the present invention in which the globoidal worm 10 is used for tightening the band 16 of a pipe or hose clamp. The worm 10 has a head 11 and a pair of trunnion portions 12 mounted in bearings not shown in FIG. 1. In the arrangement illustrated in FIG. 1 the worm gear is in form of a flexible band 16, formed for instance from metal, and wound around about a cylindrical body in form of a pipe, hose or the like not shown in the drawing and having its axis at 15. The band is provided with a plurality of cutouts 17 uniformly spaced from each other in longitudinal direction of the band and the portions of the band intermediate the cutouts 17 form in this case gear teeth of a substantially rectangular configuration having flank faces 18 respectively located in radial planes including the axis of the aforementioned cylindrical body. The worm 10 has a body portion formed by a surface of revolution of a segment of a circle coaxial with the axis of the circular wound band 16, and a thread portion extending in a helix about the body portion integral therewith. The thread portion defines in a radial plane including the axis of the worm 10 a plurality of substantially sawtooth-shaped teeth 13 having acting flank faces 14 respectively in contact with the faces 18 and intersecting a radial plane normal to the axis 15 of the circularly wound band 16 and including the axis of the worm 10 along lines passing through the center of curvature 15 of the band 16. Since the acting faces 18 of the band 16 as well as the acting faces 14 of the worm are directed to the center of curvature 15 of the band, the acting faces 14 of the worm and the acting faces 18 of the band 16 will come in surface contact with each other so that the contact pressure between these faces for a given force will be held to a minimum.

The end portion of the band 16 which is provided with the cutouts 17 overlaps the other end of the band and the bearing for the worm 10 may be connected to the other end portion of the band and be constructed in such a manner so as to straddle the band end portion which is formed with the cutouts 17 so that by turning the worm 10 in one direction about its axis the band 16 will be tightened about a pipe or hose. The forces which act on the bearing during tightening of the band 16 will act substantially only in axial direction of the worm 10 which will simplify construction of the bearing which may be formed from stamped sheet metal parts or the like.

Tightening of the band 16 in the aforementioned manner may be accomplished by turning the worm 10 by means of a screwdriver engaging the slot 21 formed in the head 11 of the worm. In order to prevent the screwdriver end engaged in the slot 21 to slip out of this slot an annular rim 20 is formed on the free end of the head 11 integral with the remainder of the worm 10 and coaxially therewith. The annular rim 20 serves at the same time to prevent undesired spreading of the two portions of the head 11 to opposite sides of the slot 21 if excessive forces are applied to the screwdriver inserted in the slot.

In order to form the slot 21 and the surrounding rim 20, the end of the head 11 is first bored out to provide a cylindrical recess having a diameter equal to the inner diameter of the rim 20 and a substantially flat bottom and subsequently thereto one or a plurality of small bores 19 are formed along a diameterical line of the head 11 and extending from the flat bottom of the first-mentioned bore into the material of the worm. Subsequently thereto the head 11 is clamped in a chuck which encompasses the head completely up to the trunnion portion 12 adjacent to the head and finally the slot 21 is pressed or hammered into the free end of the head 11 whereby the material displaced during this pressing operation will flow into the bore or bores 19 to substantially fill the same so that only a very small irregular cavity 22 will remain. If at the location of the head in which the slot is to be formed a plurality, for instance three, bores instead of the single bore 19 shown in FIG. 1 are provided, the necessary forces for forming the slot will be relatively small. On the other hand, if only one bore 19, as shown in FIG. 1, is provided, the latter is preferably formed coaxial with the axis of the worm which has the advantage that the tool for forming the slot has not to be aligned along the line at which the axes of the aforementioned plurality of bores are located.

FIG. 3 schematically illustrates the method of forming a globoidal worm 10 having teeth of substantially rectangular configuration with a chasing tool 23. The chasing tool 23 has a peripheral cutting portion in the form of a segment of the circle 24 for forming the initial outer surface 25 of a worm blank having originally a substantially cylindrical configuration and the circular cutting portion 24 of the tool 23 has a circumferential length greater than the generatrix of the outer surface 25. The chasing tool 23 has also a plurality of cutting teeth 29 of substantially rectangular configuration uniformly spaced from each other and gradually increasing in height in direction of rotation of the tool, indicated by the arrow 28, from one to the other end of the circular cutting portion 24. In forming a worm from an originally cylindrical blank, the cutting tool 23 is first moved in direction normal to the axis of the blank, as indicated by the arrow 26, toward the blank axis while the blank is slowly rotated about its axis to thus form a modified blank having a contour 25 as shown in FIG. 3 and subsequent thereto the cutting tool 23 is slowly rotated about a fixed axis 27 in the direction of the arrow 28 while the blank is roated about its axis so that the teeth 29 will cut into the blank to provide teeth of rectangular configuration on the blank. Since the teeth profiles in worm thus produced are rectangular, undercuts will result which will prevent withdrawal of the chasing tool 23 in direction opposite to the direction as indicated by the arrow 26 after the cutting teeth 29 have cut the teeth to their full height into the worm blank and in order to withdraw the tool 23 it is necessary to rotate the latter through a further angle about its axis 27 until all of the teeth 29 of the chasing tool 23 become disengaged from the cut worm and the chasing tool 23 will again assume the position relative to the worm as shown in FIG. 3.

In order to bring a worm gear into meshing engagement with the teeth of a thus produced globoidal worm, the worm gear has to be provided with a removable gear sector having a peripheral length slightly greater than the axial length of the threaded portion of the worm and in order to bring the teeth of worm and worm gear into meshing engagement, the removable sector has to be removed from the remainder of the gear and the teeth on the remainder of the worm gear are brought into meshing engagement by placing the teeth of the worm first into the cutout of the worm gear from which the sector is removed and by then turning the worm gear and the worm about their respective axes to bring the teeth thereof into engagement. Afterwards, the sector is fixedly connected to the remainder of the worm gear and for this purpose the sector may be, for instance, provided with a pair of wings on opposite sides thereof which respectively encompass the portions of the remainder of the gear and these wings may be fastened to the web portion of the remainder of the gear by dowels or screws after the gear and the worm have been brought into meshing engagement.

Figure 4:
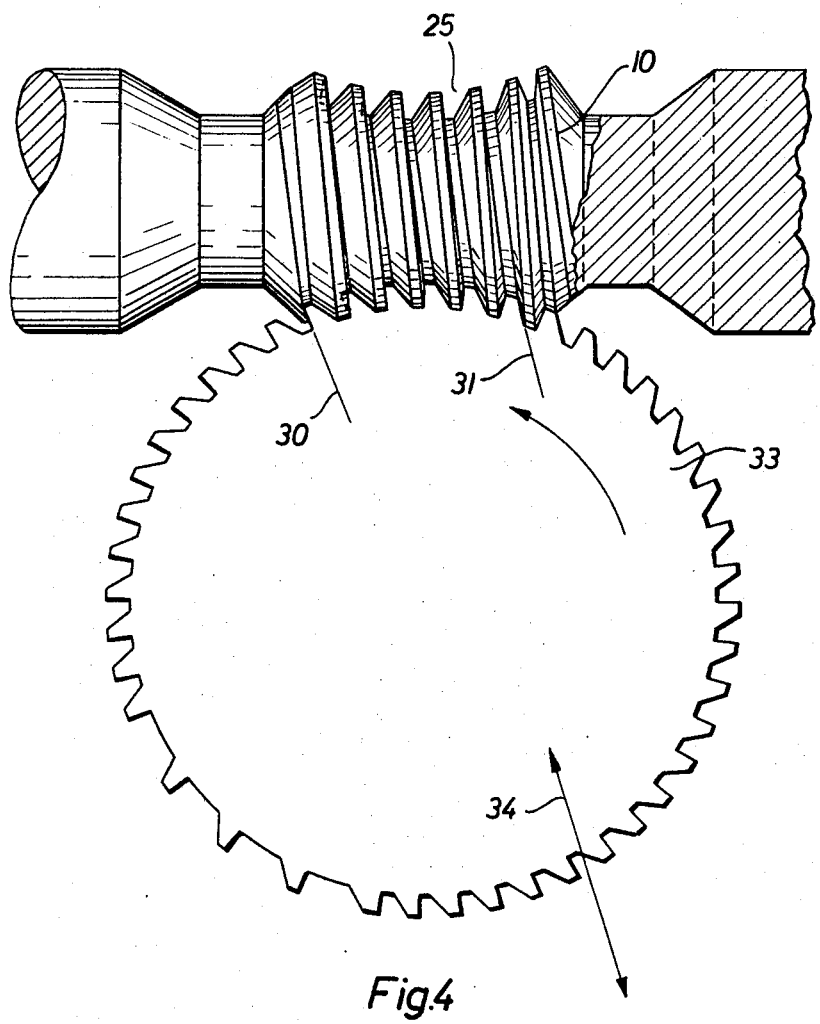
FIG. 4 is a side view of a globoidal worm having substantially sawtoothed-shaped teeth and a chasing tool for forming this worm.

FIG. 4 illustrates a chasing tool 33 having substantially sawtooth-shaped teeth for forming a worm having teeth corresponding to the cutting teeth of the chasing tool 33. The profiles of the cutting teeth of the chasing tool 33 and the length of the threaded portion of the worm are formed in such a manner that the leading flank face 30 of the leading cutting tool of the chasing tool 33 diverges in radially outward direction, that is toward the axis of the worm 10 with respect to the trailing flank face 31 of the trailing cutting tooth of the tool so that the two flank faces include a small angle with each other, or that the two flank faces extend at least parallel to each other.

After the original substantially cylindrical blank of the worm has been formed to the contour 25 as indicated in dash-dotted lines in FIG. 4, the blank is rotated about its axis and the chasing tool 33 is rotated in direction of the arrow 40 likewise about an axis normal to the axis of the blank while the chasing tool 33 is slowly advanced in direction of the arrow 34 toward the axis of the worm 10 so as to cut the teeth in the worm. The line 34 along which the chasing tool 33 is advanced bisects the angle between the flank faces 30 and 31 so that after the teeth in the worm 10 have been cut to their finished contour the chasing tool 33 may be withdrawn and disengaged from the worm about the line 34 in a direction opposite from the feeding direction.

The teeth of the globoidal worm according to the present invention may not only have the profiles as shown in FIG. 4 but the teeth may also have a symmetrical profile which tapers in radially outward direction.

Figure 5:
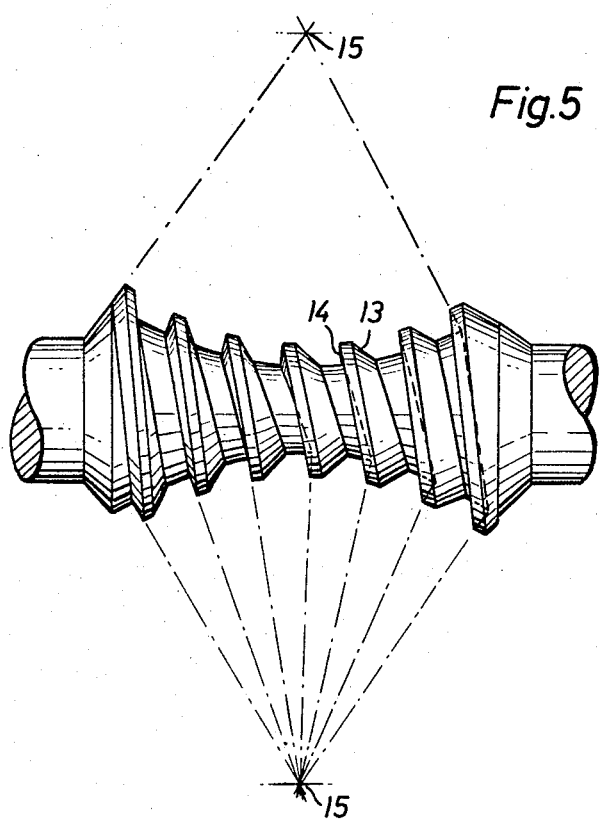
FIG. 5 is a side view of the globoidal worm according to the present invention.
Figure 6:
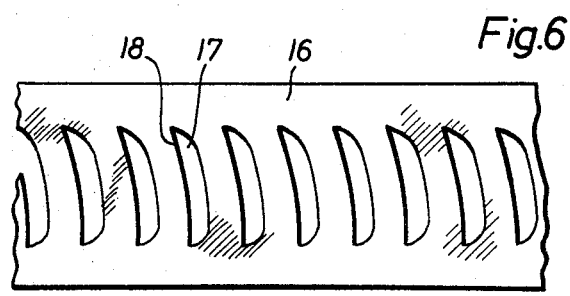
FIG. 6 is a partial top view of the clamping strip of FIG. 1.

FIG. 5 illustrates a side view of the globoidal worm according to the present invention in further detail. Since the flank faces of each turn of the worm have to be in surface contact with corresponding flank faces of the worm gear which are respectively located in radial planes including the axis of the worm gear, as indicated in dash-dot lines in FIG. 5, while the diameter of the worm in the center thereof is smaller than on opposite ends thereof, the inclination of the worm threads in the center of the worm has to be slightly steeper at the center than at the opposite ends of the worm, as clearly shown in FIG. 5. This figure shows also the undercuts in the thread. In order to compensate for the difference in the inclination of the worm threads, the acting faces 18 of the band 16 are preferebaly slightly cambered as shown in FIG. 6, in which the curvature of the faces 18 is exaggerated. If, instead of a band provided with cutouts, a worm gear meshing with the worm is provided, this worm gear is preferably also provided with gear teeth cambered in a similar manner.

It will be understood that each of the elements described above, or two or more together, may also find a useful application in other types of worm gear drives having globoidal worms and method of forming the same differing from the type described above.

While the invention has been illustrated and described as embodied in a worm gear drive having a globoidal worm especially adapted for tightening of pipe clamps or the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of forming a worm provided at one end thereof with an axially extending slot for engagement with a screwdriver for turning said worm about its axis and including an annular rim coaxial with and projecting in axial direction from said one end of said worm to prevent slipping of the engaged end of the screwdriver out of said slot, said method comprising the steps of forming an axial fore at said one end of said worm of a diameter slightly smaller than the outer diameter of said worm at said one end to thus form said annular rim and a flat bottom face substantially normal to the axis of said worm; forming within said rim at least one second bore extending inwardly from said bottom face and having a diameter considerably smaller than said first mentioned bore; and pressing said slot in said bottom face and causing cold flow of the thus displaced material into said second bore so that said bottom face remains substantially flat.

2. A method as set forth in claim 1, wherein only one second bore is formed coaxial with the axis of said worm.

(References on following page)

References Cited

UNITED STATES PATENTS

| | | | |
|---|---|---|---|
| 1,683,163 | 9/1928 | Cone | 74—458 |
| 2,069,433 | 2/1937 | Wildhaber | 74—425 X |
| 2,386,629 | 10/1945 | North et al. | 24—274 |
| 2,452,806 | 11/1948 | Tetzlaff | 24—274 |
| 2,935,886 | 5/1960 | Wildhaber | 74—458 |
| 2,944,314 | 7/1960 | Black | 24—274 X |
| 3,087,220 | 4/1963 | Tinsley | 24—274 |
| 3,146,507 | 9/1964 | Tinsley | 24—274 |
| 3,175,271 | 3/1965 | Schukraft | 24—274 |
| 3,195,204 | 7/1965 | McKown | 24—274 |
| 3,233,922 | 2/1966 | Evans | 24—19 X |
| 1,847,848 | 3/1932 | Ragan | 29—159.2 |
| 2,346,906 | 4/1944 | Cheney | 29—159.2 |
| 3,248,782 | 5/1966 | Mooney | 29—159.2 |

THOMAS H. EAGER, *Primary Examiner.*

U.S. Cl. X.R.

10—27; 24—274; 29—558; 74—425, 458